Patented Jan. 23, 1934

1,944,281

UNITED STATES PATENT OFFICE 1,944,281

PROCESS OF PRODUCING CHEMICAL COMPOUNDS

Thomas G. Stephens, Cleveland, Ohio

No Drawing. Application February 25, 1932
Serial No. 595,219

18 Claims. (Cl. 23—135)

This invention relates to chemical processes for manufacturing zinc sulphide and barium hydroxide.

There is at the present time no simple method for the preparation of barium hydroxide. The customary procedure in the manufacture of this compound is to start with barytes which is mixed with coal or other carbonaceous fuel and heat it in a furnace out of contact with the air. This results in the formation of barium sulphide commonly known as black ash. This black ash is then leached with water, a solution of barium sulphide being recovered. The solution of barium sulphide is then precipitated by carbon dioxide or sodium carbonate or other material to form barium carbonate. The barium carbonate is then washed and is afterwards heated to a high temperature to form barium oxide. This barium oxide when leached with water forms barium hydroxide solution and on cooling of the barium hydroxide solution, crystals of barium hydrate $(Ba(OH)_2.8H_2O)$ separate out and are recovered. This entire procedure is long, costly and laborious.

There is at the present time furthermore no economical method for the production of zinc sulphide suitable for use in paint pigments. The cost of production of zinc sulphide suitable for use in paint pigment has been so high as to limit its use for such purpose. There are various methods proposed and in use for the production of zinc sulphide, such as precipitation of soluble zinc salts with soluble sulphides. Also processes which depend upon the reaction of sulphide in gaseous form with zinc in gaseous form. All of these methods are expensive and have limited the use of zinc sulphide as a paint pigment.

It is an object of my invention, therefore, to provide an improved method for the production of barium hydroxide and other barium salts.

Another object of my invention is to provide an improved process for the production of zinc sulphide.

Another object of my invention is to provide a process for producing an intimate mixture of barium sulphate and zinc sulphide adapted to be used as a paint pigment at a relatively low cost.

Another object of my invention is to provide a process for producing an intimate mixture of zinc sulphide, barium sulphate, and titanium dioxide, adapted to be used as a paint pigment at a relatively low cost.

Another object of my invention is to provide a process for producing paint pigments at comparatively low cost.

Another object of my invention is to provide a comparatively inexpensive process for producing paint pigments containing zinc sulphide, or containing an intimate mixture of barium sulphate and zinc sulphide; or containing an intimate mixture of zinc sulphide, barium sulphate, and titanium dioxide.

The process by which my invention is practiced, as will hereinafter more fully appear is based upon the following chemical equation:

$$BaS + H_2O + ZnO = Ba(OH)_2 + ZnS.$$

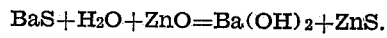

The reactions expressed by this equation, while theoretically complete, do not take place completely in practice and my invention therefore comprises the process of effecting the reactions of this equation together with supplemental steps of process by which these reactions may be completed.

The barium sulphide, in the form of an aqueous solution, which is kept at a temperature above 60° centigrade is allowed to run slowly into a water slurry of zinc oxide which is also kept at a temperature above 60° centigrade, and which is agitated or stirred by any suitable means.

The reaction proceeds, as shown by the absence of any soluble sulphide in the slurry, until about 94 to 98% of the amount of barium sulphide indicated by the above chemical equation has been used. The barium hydroxide in the slurry will then show the presence of soluble barium sulphide when it is tested with 5% nickel sulphate solution. The barium hydroxide will then also contain in solution a certain amount of zinc oxide which cannot be precipitated by any additional quantity of barium sulphide solution. However, if a sulphide solution of a stronger base, such as sodium, or ammonium sulphide, be now added to the slurry, in a quantity equivalent to approximately 2 to 6% of the barium sulphide indicated by the above chemical equation, the dissolved zinc oxide will be precipitated as zinc sulphide, and an equivalent amount of sodium or ammonium hydroxide will remain in solution.

The barium hydroxide is now free of dissolved zinc, and if properly prepared will not contain more than a few tenths of one per cent of sulphur compounds calculated as barium sulphide.

The barium hydroxide solution is separated from the zinc sulphide by filtration, or other suitable means, and any sulphur compounds remaining in solution are removed by passing a current of air through the hot barium hydroxide solution whereby the soluble sulphur compounds are readily oxidized to insoluble compounds such as barium sulphite, and barium sulphate, and are precipitated from the solution. I have found that the removal of the soluble sulphur compounds by oxidation and precipitation may be greatly accelerated by the presence of a relatively small amount of ozone in the air used for such oxidation. Ozone in the air, in a concentration as low as 0.1% by volume, is an effective agent in the removal of soluble sulphur compounds from barium hydroxide solutions.

I believe that the ozone acts as a catalyst in accelerating the removal of the soluble sulphur compounds from the barium hydroxide solutions and any catalyst which effects a similar result may be used. The ozone is preferably not used in excess of ½% by volume.

After purification, the barium hydroxide solution is clarified by filtration or other suitable means, and is allowed to cool, whereupon white crystals of Ba(OH)$_2$8H$_2$O separate from the solution and may be recovered by any suitable method. The crystals so recovered are remarkable for their chemical purity, being superior to any commercial barium hydrate found on the market today.

The zinc sulphide formed in the initial reaction of my process contains only traces of unconverted zinc oxide. It is, however, highly adsorptive, and contains a certain amount of adsorbed barium hydroxide which cannot be removed from the zinc sulphide by water washing.

To remove the adsorbed barium hydroxide the zinc sulphide is reslurried in water and acidulated with dilute hydrochloric acid to pH 6.0. The barium hydroxide is thus converted to barium chloride, which in a slightly acid condition is easily separated from the zinc sulphide by water washing and decantation of the wash water. The barium chloride may be recovered from the wash water by evaporation and crystallization, or by any other suitable method. After the largest part of the barium chloride has been removed by water washing, I find it advisable to make the zinc sulphide-water slurry slightly alkaline with barium sulphide solution in order to prevent the zinc sulphide from becoming colloidal. Washing is then continued in a slightly alkaline solution until the barium chloride is practically all removed. The zinc sulphide is then more than 99% pure and, after proper further treatment, is suitable for use as a paint pigment.

As a modification of my process, the zinc sulphide produced in the initial reaction, after separation from the barium hydroxide solution, by filtration or otherwise, is reslurried in water and the adsorbed barium hydroxide which the zinc sulphide contains is neutralized by the addition of dilute sulphuric acid, there being formed thereby a precipitate of barium sulphate which is very intimately mixed with the zinc sulphide. This intimate mixture of zinc sulphide and barium sulphate is, after proper treatment, suitable for use as a paint pigment.

In another modification of my process the zinc sulphide produced in the initial reaction, after separation from the barium hydroxide solution, by filtration or other suitable method, is reslurried in water, and the adsorbed barium hydroxide which the zinc sulphide contains is neutralized by the addition of a sulphuric acid solution of titanium sulphate, there being formed thereby a precipitate of barium sulphate and titanium dioxide, which is very intimately mixed with the zinc sulphide. This intimate mixture of zinc sulphide, barium sulphate, and titanium dioxide is, after proper treatment, suitable for use as a paint pigment.

All of the pigments produced by my process must be dried, and then heated to redness out of contact with the oxygen of the air before they are suitable for use in paints.

This heating, or calcination, of the pigments may be carried out in any suitable furnace or retort. The pigments are susceptible to oxidation when heated to redness, and to insure that the atmosphere in the furnace or retort shall be as free of any oxidizing atmosphere as possible, it is convenient to add to the pigments, prior to drying and heating, about 2% of their dry weight of elemental sulphur in finely divided form. The sulphur on being heated combines with any oxygen in the furnace or retort and effectively protects the pigments from oxidation.

After heating to redness the pigments are quenched in water, wet ground in water slurry in any suitable manner, and the finely ground pigments in water slurry are acidulated to pH 5.0 with dilute sulphuric acid. The pigments are then washed with water to remove any soluble salts; the slurry is made slightly alkaline with any suitable material; bluing is added if desirable; the pigments are then filter pressed, dried, ground and packed.

The pigments made by my process are notable for their great tinting strength. They also have good light resistance, bright white color, and normal oil absorption, all of which makes them highly desirable for use as paint pigments.

In carrying out my process as indicated by the equation:

$$BaS + H_2O + ZnO = Ba(OH)_2 + ZnS$$ 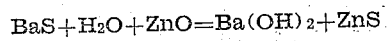

it is preferable to use a zinc oxide of high degree of purity, and of fine particle size. Such a zinc oxide is conveniently made from electrolytic spelter by the so-called French process. Zinc oxides made by the so-called American process are not suitable, due to the impurity which they contain, which causes off-color zinc sulphide.

In carrying out my process as indicated by the above equation, it is preferable to use a water slurry of zinc oxide which contains about 12 grams of zinc oxide in each 100 cubic centimeters of slurry, although my process is not limited to such concentration.

In carrying out my process as indicated by the above equation, it is preferable to use an aqueous solution of barium sulphide which contains in solution the equivalent of 15 to 20% of barium sulphide, although the process is not limited to such concentration.

Although I have pointed out and described the preferred method of carrying out my invention, it is understood that compounds of widely varying physical properties may be formed by varying the factors governing the process without departing from the spirit and scope thereof.

What I claim is:

1. The process of producing a pigment substantially of zinc sulphide which includes causing an aqueous solution of barium sulphide at a temperature of 60° C. or higher to mix with a slurry of zinc oxide at a temperature of 60° C. or higher, allowing them to react chemically to form precipitate zinc sulphide contaminated with adsorbed barium hydroxide and barium hydroxide contaminated with zinc oxide, precipitating out the zinc sulphide, making a water slurry of zinc sulphide and adsorbed barium hydroxide, adding dilute sulphuric acid to convert the barium hydroxide into barium sulphate and precipitating the barium sulphate and the zinc sulphide in an intimately mixed state and filtering off the remaining solution.

2. The process of producing a pigment substantially of zinc sulphide which includes causing an aqueous solution of barium sulphide at a temperature of 60° C. or higher to mix with a slurry of zinc oxide at a temperature of 60° C. or higher, allowing them to react chemically to form precipitate zinc sulphide contaminated with adsorbed barium hydroxide and barium hydroxide contaminated with zinc oxide, precipitating out the zinc sulphide, making a water slurry of zinc sulphide and adsorbed barium hydroxide, adding a sulphuric acid solution of titanium sulphate to convert the barium hydroxide into a precipitate of barium sulphate and titanium dioxide and precipitating the zinc sulphide, barium sulphate and titanium dioxide out of the solution in an intimately mixed state.

3. The process of producing barium hydroxide comprising the steps of causing an aqueous solution of barium sulfide at a temperature of 60° C. or higher to mix with a water slurry of zinc oxide at a temperature of 60° C. or higher, allowing them to react chemically until only a relatively small amount of barium sulfide remains in solution, thereby forming precipitate zinc sulfide and a relatively large amount of barium hydroxide containing a small amount of dissolved zinc oxide, adding a small amount of sulfide solution of a relatively stronger base such as sodium or ammonium to thereby precipitate the zinc oxide as zinc sulfide, and filtering off the barium hydroxide solution.

4. The process described in claim 3 characterized by converting sulphur compounds remaining in the barium hydroxide to insoluble precipitate compounds.

5. The process described in claim 3 characterized by converting sulphur compounds remaining in the barium hydroxide to insoluble precipitate compounds by passing a current of air through the heated barium hydroxide.

6. The process described in claim 3 characterized by converting sulphur compounds remaining in the barium hydroxide into insoluble precipitate compounds by passing a current of gas containing ozone through the heated barium hydroxide.

7. The process of producing zinc sulfide comprising the steps of causing an aqueous solution of barium sulfide at a temperature of 60° C. or higher to mix with a water slurry of zinc oxide at a temperature of 60° C. or higher, allowing them to react chemically, forming precipitate zinc sulfide containing adsorbed barium hydroxide, removing the zinc sulfide from the solution, making a water slurry of the zinc sulfide, adding an aqueous solution of hydrochloric acid thereby converting the adsorbed barium hydroxide to barium chloride, and washing out the barium chloride.

8. The process of making zinc sulfide as described in claim 7 characterized by making the aqueous solution of hydrochloric acid to substantially pH 6.0 and after washing out the major portion of the barium chloride, making the slurry slightly alkaline to prevent the zinc sulfide from becoming colloidal, and then washing out the remainder of the barium chloride.

9. The process of making zinc sulfide as described in claim 7 characterized by making the aqueous solution of hydrochloric acid to substantially pH 6.0 and after washing out the major portion of the barium chloride, making the slurry slightly alkaline by adding barium sulfide solution to prevent the zinc sulfide from becoming colloidal, and then washing out the remainder of the barium chloride.

10. The process of producing barium hydroxide which includes making a water slurry of zinc oxide, heating the same to 60° C. or higher, making an aqueous solution of barium sulphide, heating the same to 60° C. or higher, adding the barium sulphide to the zinc oxide water slurry to cause the chemical reaction expressed by the equation $BaS + ZnO + H_2O = Ba(OH)_2 + ZnS$ to take place, adding a solution of sodium sulphide or ammonium sulphide, filtering off barium hydroxide solution, passing currents of air through the same to convert remaining sulphur compounds into insoluble form.

11. The process of producing barium hydroxide which includes making a water slurry of zinc oxide, heating the same to 60° C. or higher, making an aqueous solution of barium sulphide, heating the same to 60° C. or higher, adding the barium sulphide to the zinc oxide water slurry to cause the chemical reaction expressed by the equation $BaS + ZnO + H_2O = Ba(OH)_2 + ZnS$ to take place, adding a solution of sodium sulphide or ammonium sulphide, filtering off barium hydroxide solution, passing currents of air including a small proportion of ozone therethrough to convert remaining sulphur compounds into insoluble form.

12. The process of producing barium hydroxide which includes making a water slurry of zinc oxide, heating the same to 60° C. or higher, making an aqueous solution of barium sulphide, heating the same to 60° C. or higher, adding the barium sulphide to the zinc oxide water slurry to cause the chemical reaction expressed by the equation $BaS + ZnO + H_2O = Ba(OH)_2 + ZnS$ to take place, adding a solution of sodium sulphide or ammonium sulphide, filtering off barium hydroxide solution, treating the barium hydroxide solution with a catalyst to convert into insoluble form sulphur compounds in solution.

13. The process of producing barium hydroxide which includes making a water slurry of zinc oxide, heating the same to 60° centigrade or higher, making an aqueous solution of barium sulphide, heating the same to 60° centigrade or higher, adding the barium sulphide solution to the zinc oxide water slurry, producing thereby a precipitate of zinc sulphide, and barium hydroxide solution contaminated with zinc oxide, adding a solution of sodium sulphide or ammonium sulphide to convert unconverted zinc oxide into zinc sulphide, precipitating the zinc sulphide leaving sodium hydroxide or ammonium hydroxide in the solution, filtering off the barium hydroxide solution, and passing currents of air or air containing ozone through the barium hydroxide solution to convert into insoluble form sulphur compounds remaining in solution.

14. The process of producing barium hydroxide which includes making a water slurry of zinc oxide, heating the same to 60° C. or higher, making an aqueous solution of barium sulphide, heating the same to 60° C. or higher, adding the barium sulphide solution to the zinc oxide water slurry until the barium sulphide present is approximately 95% of that indicated in the equation $BaS + ZnO + H_2O = Ba(OH)_2 + ZnS$, thus producing a precipitate of zinc sulphide, and barium hydroxide contaminated with zinc oxide and barium sulphide, adding a solution of sodium sulphide or of ammonium sulphide in the proportion of approximately 5% to convert the zinc oxide into precipitate zinc sulphide leaving the sodium hydroxide or ammonium hydroxide in the solution, filtering off the barium hydroxide solution leaving the zinc sulphide as a precipitate, passing currents of air or air containing ozone through the barium hydroxide solution to convert into insoluble form and precipitate any sulphur compounds remaining in solution.

15. The process of producing zinc sulphide which includes making a water slurry of zinc oxide, heating the same to 60° C. or higher, making an aqueous solution of barium sulphide, heating the same to 60° C. or higher, adding the barium sulphide solution to the zinc oxide water slurry, to cause the reaction $$BaS + ZnO + H_2O = Ba(OH)_2 + ZnS$$

to take place, filtering out the zinc sulphide, reslurring the zinc sulphide with water and adding hydrochloric acid, removing barium chloride produced thereby, and washing out the barium chloride.

16. The process of producing zinc sulphide which includes making a water slurry of zinc oxide, heating the same to 60° C. or higher, making an aqueous solution of barium sulphide, heating the same to 60° C. or higher, adding the barium sulphide solution to the zinc oxide water slurry, to cause the reaction $$BaS + ZnO + H_2O = Ba(OH)_2 + ZnS$$

to take place, producing zinc sulphide contaminated with barium hydroxide, filtering out the zinc sulphide, reslurring the zinc sulphide with water and adding hydrochloric acid to convert the barium hydroxide into barium chloride, and washing out the barium chloride.

17. The process of producing zinc sulphide which includes making a water slurry of zinc oxide, heating the same to 60° centigrade or higher, making an aqueous solution of barium sulphide, heating the same to 60° centigrade or higher, adding the barium sulphide solution to the zinc oxide water slurry until the barium sulphide present is approximately 95% of that indicated in the equation $$BaS + ZnO + H_2O = Ba(OH)_2 + ZnS$$

and producing thereby a precipitate of zinc sulphide contaminated with barium hydroxide, filtering out the contaminated zinc sulphide, reslurring the zinc sulphide with water and adding hydrochloric acid to convert the barium hydroxide into barium chloride, washing out barium chloride, adding to the zinc sulphide and water slurry, barium sulphide solution, to prevent the zinc sulphide from becoming colloidal, and washing out the remaining barium chloride.

18. The process of producing zinc sulphide which includes making a water slurry of zinc oxide, heating the same to 60° centigrade or higher, making an aqueous solution of barium sulphide, heating the same to 60° centigrade or higher, adding the barium sulphide solution to the zinc oxide water slurry until the barium sulphide present is approximately 95% of that indicated in the equation $$BaS + ZnO + H_2O = Ba(OH)_2 + ZnS$$

and producing thereby a precipitate of zinc sulphide contaminated with barium hydroxide solution, filtering out the contaminated zinc sulphide, reslurring the zinc sulphide with water and adding hydrochloric acid to convert the barium hydroxide into barium chloride, adding to the zinc sulphide and water slurry, barium sulphide solution, to prevent the zinc sulphide from becoming colloidal, washing out the barium chloride, and adding 2% sulphur to the zinc sulphide to prevent undue oxidation upon calcining, and calcining the mixture.

THOMAS G. STEPHENS.